US012228407B2

(12) United States Patent
Twining

(10) Patent No.: US 12,228,407 B2
(45) Date of Patent: Feb. 18, 2025

(54) SYSTEMS AND METHODS FOR DELIVERY USING UNMANNED AERIAL VEHICLES

(71) Applicant: AEROVIRONMENT, INC., Arlington, VA (US)

(72) Inventor: David Twining, San Diego, CA (US)

(73) Assignee: AeroVironment, Inc., Arlington, VA (US)

( * ) Notice: Subject to any disclaimer, the term of this patent is extended or adjusted under 35 U.S.C. 154(b) by 256 days.

(21) Appl. No.: 17/423,087

(22) PCT Filed: Jan. 14, 2020

(86) PCT No.: PCT/US2020/013494
§ 371 (c)(1),
(2) Date: Jul. 14, 2021

(87) PCT Pub. No.: WO2020/209915
PCT Pub. Date: Oct. 15, 2020

(65) Prior Publication Data
US 2022/0081113 A1    Mar. 17, 2022

Related U.S. Application Data

(60) Provisional application No. 62/792,810, filed on Jan. 15, 2019.

(51) Int. Cl.
*G01C 21/10* (2006.01)
*B64U 10/13* (2023.01)
(Continued)

(52) U.S. Cl.
CPC ............. *G01C 21/10* (2013.01); *B64U 10/13* (2023.01); *B64U 70/95* (2023.01); *B64U 80/84* (2023.01);
(Continued)

(58) Field of Classification Search
CPC ...... B64C 39/024; G01C 21/10; B64U 10/13; B64U 70/00; B64U 2101/30; B64U 2101/60; B64U 2201/104
See application file for complete search history.

(56) References Cited

U.S. PATENT DOCUMENTS 5,235,513 A    8/1993   Velger et al.
5,457,639 A   10/1995   Ulich et al.
(Continued)

FOREIGN PATENT DOCUMENTS

CN    103868521 B    6/2016
CN    206485525 U    9/2017
(Continued)

OTHER PUBLICATIONS

Unmanned Aerial Vehicle Landing on Maritime Vessels using Signal Prediction of the Ship Motion (Year: 2018).*
(Continued)

*Primary Examiner* — Anne Marie Antonucci
*Assistant Examiner* — Lidia Kwiatkowska
(74) *Attorney, Agent, or Firm* — Command IP LLP; Pejman Yedidsion; Eric Aagaard

(57) ABSTRACT

The present disclosure provides systems and methods for delivery using unmanned aerial vehicles (UAVs). In an aspect, the present disclosure provides an unmanned aircraft system, comprising: a communications unit; and a UAV comprising: a non-transitory computer-readable medium; a lift system comprising lift mechanisms to propel the UAV; a sensor system to obtain sensor information related to the UAVs environment; a processor to control operation of the lift system and the sensor system; an object detection module to detect potential mobile landing structures within the UAVs environment based on the sensor information; a mobile landing area recognition module to identify a mobile
(Continued)

landing area on a mobile landing structure based on the sensor information; and a navigation module to estimate a real-time state of the mobile landing area based on the sensor information or the mobile landing area and to land the UAV onto the mobile landing area.

20 Claims, 8 Drawing Sheets

(51) Int. Cl.
  *B64U 70/95* (2023.01)
  *B64U 80/84* (2023.01)
  *B64U 101/30* (2023.01)
  *B64U 101/64* (2023.01)

(52) U.S. Cl.
  CPC ...... *B64U 2101/30* (2023.01); *B64U 2101/64* (2023.01); *B64U 2201/10* (2023.01); *B64U 2201/104* (2023.01); *B64U 2201/20* (2023.01)

(56) References Cited

U.S. PATENT DOCUMENTS

| | | | |
|---|---|---|---|
| 5,906,336 A | 5/1999 | Eckstein | |
| 6,064,924 A | 5/2000 | Fleischmann | |
| 6,868,314 B1 | 3/2005 | Frink | |
| 8,148,992 B2 | 4/2012 | Kowalczyk et al. | |
| 9,056,676 B1 | 6/2015 | Wang | |
| 9,139,310 B1 | 9/2015 | Wang | |
| 9,675,419 B2 | 6/2017 | Akeel et al. | |
| 9,896,203 B1 | 2/2018 | Kim et al. | |
| 10,023,326 B2 | 7/2018 | Byers et al. | |
| 10,053,217 B2 | 8/2018 | Cho et al. | |
| 10,209,707 B2 | 2/2019 | Matuszeski et al. | |
| 10,322,820 B2 | 6/2019 | Husain et al. | |
| 10,370,102 B2 | 8/2019 | Boykin et al. | |
| 10,373,097 B2 | 8/2019 | Kulkarni et al. | |
| 10,434,885 B2 | 10/2019 | Antonini et al. | |
| 10,553,122 B1 | 2/2020 | Gilboa-Amir et al. | |
| 10,604,020 B2 | 3/2020 | Ricci | |
| 10,701,913 B2 | 7/2020 | Twining et al. | |
| 10,705,541 B2 | 7/2020 | Twining et al. | |
| 11,430,332 B2 * | 8/2022 | Rivers | G05D 1/0027 |
| 2006/0058928 A1 | 3/2006 | Beard et al. | |
| 2008/0207067 A1 | 8/2008 | Ricciuti et al. | |
| 2008/0260467 A1 | 10/2008 | Kroecker et al. | |
| 2011/0049288 A1 | 3/2011 | Suzuki | |
| 2011/0049290 A1 | 3/2011 | Seydoux et al. | |
| 2011/0068224 A1 | 3/2011 | Kang et al. | |
| 2011/0202209 A1 | 8/2011 | Moresve | |
| 2011/0264314 A1 | 10/2011 | Parras | |
| 2011/0307126 A1 | 12/2011 | Hogstrom | |
| 2012/0076397 A1 | 3/2012 | Moresve | |
| 2012/0271461 A1 | 10/2012 | Spata | |
| 2013/0054054 A1 | 2/2013 | Tollenaere et al. | |
| 2013/0120166 A1 | 5/2013 | Kommuri et al. | |
| 2014/0111332 A1 | 4/2014 | Przybylko et al. | |
| 2014/0124621 A1 | 5/2014 | Godzdanker et al. | |
| 2014/0152792 A1 | 6/2014 | Krueger | |
| 2014/0222246 A1 | 8/2014 | Mohamadi | |
| 2014/0236390 A1 | 8/2014 | Mohamadi | |
| 2014/0324253 A1 | 10/2014 | Duggan et al. | |
| 2014/0350754 A1 | 11/2014 | Elgersma et al. | |
| 2014/0379173 A1 | 12/2014 | Knapp et al. | |
| 2015/0025797 A1 | 1/2015 | Hardesty et al. | |
| 2015/0183498 A1 | 7/2015 | Wardle | |
| 2015/0207964 A1 | 7/2015 | Bye et al. | |
| 2015/0253126 A1 | 9/2015 | Palandro et al. | |
| 2015/0262492 A1 | 9/2015 | Barnes et al. | |
| 2015/0277442 A1 | 10/2015 | Ballou | |
| 2015/0298654 A1 | 10/2015 | Joao et al. | |
| 2015/0304813 A1 | 10/2015 | Esposito et al. | |
| 2015/0336669 A1 | 11/2015 | Kantor et al. | |
| 2015/0353206 A1 | 12/2015 | Wang | |
| 2015/0370250 A1 | 12/2015 | Bachrach et al. | |
| 2015/0370251 A1 | 12/2015 | Siegel et al. | |
| 2016/0018224 A1 | 1/2016 | Isler et al. | |
| 2016/0068264 A1 | 3/2016 | Ganesh et al. | |
| 2016/0122038 A1 | 5/2016 | Fleischman et al. | |
| 2016/0124431 A1 | 5/2016 | Kelso et al. | |
| 2016/0144734 A1 | 5/2016 | Wang et al. | |
| 2016/0284222 A1 | 9/2016 | Nicholls et al. | |
| 2016/0306824 A1 | 10/2016 | Lopez et al. | |
| 2016/0340006 A1 | 11/2016 | Tang | |
| 2016/0364989 A1 | 12/2016 | Speasl et al. | |
| 2016/0376000 A1 | 12/2016 | Kohstall | |
| 2017/0069214 A1 | 3/2017 | Dupray et al. | |
| 2017/0129603 A1 * | 5/2017 | Raptopoulos | B64F 1/22 |
| 2017/0137118 A1 | 5/2017 | Gentry | |
| 2017/0139424 A1 | 5/2017 | Li | |
| 2017/0144776 A1 | 5/2017 | Fisher et al. | |
| 2017/0197718 A1 | 7/2017 | Buchmueller | |
| 2017/0240277 A1 | 8/2017 | Molnar et al. | |
| 2017/0267374 A1 | 9/2017 | Derenick et al. | |
| 2017/0301109 A1 | 10/2017 | Chan et al. | |
| 2018/0033315 A1 | 2/2018 | Winkle | |
| 2018/0037322 A1 | 2/2018 | Buchmueller et al. | |
| 2018/0072419 A1 | 3/2018 | Burgess et al. | |
| 2018/0101173 A1 | 4/2018 | Banerjee et al. | |
| 2018/0186433 A1 | 7/2018 | Gharabegian | |
| 2018/0217256 A1 | 8/2018 | Stokes | |
| 2018/0321680 A1 | 11/2018 | Tu | |
| 2018/0357910 A1 * | 12/2018 | Hobbs | G01S 1/08 |
| 2018/0364740 A1 * | 12/2018 | Collins | G06V 20/176 |
| 2019/0128711 A1 | 5/2019 | Connor et al. | |
| 2019/0202530 A1 | 7/2019 | Rikoski | |
| 2019/0266712 A1 | 8/2019 | Chirayath | |
| 2020/0011995 A1 | 1/2020 | Send et al. | |
| 2020/0264171 A1 | 8/2020 | Jain et al. | |
| 2021/0129982 A1 | 5/2021 | Collins et al. | |

FOREIGN PATENT DOCUMENTS

| | | | | |
|---|---|---|---|---|
| EP | 3274256 A2 | 1/2018 | | |
| KR | 20130009893 A | 1/2013 | | |
| KR | 101236195 B1 | 2/2013 | | |
| TW | 201445470 A | 12/2014 | | |
| WO | WO-2006132713 A2 | 12/2006 | | |
| WO | WO-2010071502 A1 | 6/2010 | | |
| WO | WO-2013100849 A1 | 7/2013 | | |
| WO | WO-2013171735 A1 | 11/2013 | | |
| WO | WO-2014016240 A1 | 1/2014 | | |
| WO | WO-2015012935 A2 | 1/2015 | | |
| WO | WO-2015154148 A1 | 10/2015 | | |
| WO | WO-2015179797 A1 | 11/2015 | | |
| WO | WO-2016022347 A1 | 2/2016 | | |
| WO | WO-2016204843 A2 * | 12/2016 | | B64D 45/00 |
| WO | WO-2017027836 A1 | 2/2017 | | |
| WO | WO-2017123768 A1 * | 7/2017 | | A01K 79/00 |
| WO | WO-2017165854 A2 | 9/2017 | | |
| WO | WO-2019226917 A1 | 11/2019 | | |
| WO | WO-2020209915 A2 | 10/2020 | | |

OTHER PUBLICATIONS

EP19807676.2 European Search Report dated Jan. 4, 2022.
EP16812080.6 European Office Action dated Mar. 10, 2020.
EP16812080.6 Extended Search Report dated Sep. 28, 2018.
European Application No. 17738939.2 Search Report dated Jul. 31, 2019.
Gautam et al. A survey of autonomous landing techniques for UAVs. International Conference On Unmanned Aircraft Systems (ICUAS), IEEE. Orlando, Fl. (pp. 1210-1218) (2014).
Israel Patent Application No. 254693 Office Action dated Sep. 12, 2020.
PCT/US2016/024347 International Preliminary Report on Patentability dated Oct. 12, 2017.
PCT/US2016/024347 International Search Report and Written Opinion dated Jan. 10, 2017.
PCT/US2017/013203 International Preliminary Report on Patentability dated Jul. 17, 2018.

(56) References Cited

OTHER PUBLICATIONS

PCT/US2017/013203 International Search Report and Written Opinion dated Apr. 25, 2017.
PCT/US2018/038330 International Search Report and Written Opinion dated Sep. 18, 2018.
PCT/US2019/033792 International Preliminary Report on Patentability dated Nov. 24, 2020.
PCT/US2019/033792 International Search Report and Written Opinion dated Aug. 28, 2019.
PCT/US2020/013494 International Search Report and Written Opinion dated Oct. 8, 2020.
Taiwanese Patent Application No. 105109691 Office Action dated Feb. 21, 2020 (with English Translation).
U.S. Appl. No. 15/561,400 Final Action dated Jan. 7, 2019.
U.S. Appl. No. 15/561,400 Final Office Action dated Aug. 8, 2019.
U.S. Appl. No. 16/012,498 Final Office Action dated Aug. 24, 2020.
U.S. Appl. No. 16/012,498 Office Action dated Apr. 7, 2020.
U.S. Appl. No. 16/012,498 Office Action dated Dec. 11, 2020.
U.S. Appl. No. 16/069,861 Office Action dated Oct. 1, 2019.
Yoo et al. Sea wave modeling and shipboard landing simulation of tilt rotor unmanned aerial vehicle. 2013 13th International Conference On Control, Automation And Systems (ICCAS 2013), IEEE. Kimdaejung Convention Center, Gwangju, Korea. (pp. 1854-1859) (2013).

* cited by examiner

SYSTEMS AND METHODS FOR DELIVERY USING UNMANNED AERIAL VEHICLES

CROSS-REFERENCE

This application is the National Stage entry of International Application No. PCT/US20/13494 filed on Jan. 14, 2020, which claims the benefit of U.S. Provisional Patent Application No. 62/792,810, filed Jan. 15, 2019, all of which are incorporated by reference herein in their entireties.

BACKGROUND

Robots are machines that are typically programmable by a computer and are capable of carrying out a complex series of actions. Unmanned aerial vehicles (UAVs) are certain types of robotic devices that can be used for performing surveillance, reconnaissance, and exploration tasks for military and civilian applications.

SUMMARY

Current techniques for delivery of parcels from shore to ships can be expensive and laborious, requiring humans to be deployed into the field, often into harsh offshore environments. In many current shore-to-ship parcel delivery scenarios, a manned vessel carrying the parcel is deployed to the ship, and a human delivers the parcel to the ship, which may have to slow or stop its movement, and involves some level of risk. Alternatively, a UAV carrying the parcel or payload is deployed to the ship, and a human on the moving vessel manually retrieves the parcel from the UAV.

The present disclosure provides systems and methods comprising UAVs (a.k.a. drones) that can be launched from the ground, a boat, or other vehicle, then transit to a target vessel, while capturing high-resolution images of potential landing targets in an environment of the UAV, which can be processed and analyzed for identification of the correct landing target. This approach can significantly speed up shore-to-ship parcel delivery processes, and may have additional benefits of reducing risk by not needing a human to manually perform or assist in the parcel delivery. Among the advantages of the autonomous UAV delivery approach are an improvement in the efficiency and reduction in the cost and risk associated with such shore-to-ship deliveries.

The systems and methods provided herein may include software modules and/or algorithms for autonomous takeoff and landing onto moving landing targets, such as moving ships or vessels. Disclosed herein are non-limiting exemplary operations (e.g., CONOPS) in which a UAV is deployed from shore, transits to an estimated location of a vessel, identifies the target vessel among a set of potential vessels based on an identifier (e.g., a visual identifier, beacon (e.g., global navigation satellite system (GNSS), global positioning system (GPS), bearing/range beacon, laser beacon), RF receiver, laser designator system, radar system, direction finding (DF) system, etc.), and precisely lands on a small landing area on the vessel, delivers or unloads the parcel or payload, and performs takeoff to return to shore. Disclosed herein, in some cases, are technologies to enable this unmanned system. Also disclosed herein are hardware, software, and other elements that integrate the component technologies into a heterogeneous UAS that works synergistically. Disclosed herein, in some cases, are autonomous high-precision launch and landing of a UAV onto a moving platform of a vessel for parcel delivery or other operations.

In an aspect, the present disclosure provides an unmanned aircraft system, comprising: a communications unit accessible by a user, the communications unit having a user interface, a storage medium, and a communication element; and an unmanned aerial vehicle (UAV) comprising: a non-transitory computer-readable medium configured to store information and executable programmed modules; a lift system comprising one or more lift mechanisms configured to propel the UAV; a sensor system configured to obtain sensor information related to an environment of the UAV and at least one of store sensor information in the non-transitory computer-readable medium and transmit sensor information to the communications unit; a processor configured to control operation of the lift system and the sensor system, the processor communicatively coupled with the non-transitory computer-readable medium and configured to execute programmed modules stored therein; an object detection module stored in the non-transitory computer-readable medium and configured to be executed by the processor, the object detection module configured to obtain sensor information stored in the non-transitory computer-readable medium by the sensor system and detect potential mobile landing structures within the environment of the UAV based on an analysis of the sensor information; a mobile landing area recognition module stored in the non-transitory computer-readable medium and configured to be executed by the processor, the mobile landing area recognition module configured to obtain sensor information stored in the non-transitory computer-readable medium by the sensor system and identify a mobile landing area on a mobile landing structure based on an analysis of the sensor information; and a navigation module stored in the non-transitory computer-readable medium and configured to be executed by the processor, the navigation module configured to estimate a real-time state of the mobile landing area based on an analysis of the sensor information, the identification of the mobile landing area, or both, the navigation module further configured to control operation of the lift system to bring the UAV into contact with a surface of the mobile landing area.

In some embodiments, the object detection module is further configured to communicate the detected potential mobile landing structures to the communications unit. In some embodiments, the object detection module is further configured to determine a physical location of the potential mobile landing structure based on an analysis of at least one of the sensor information, an estimated coordinate location of the potential mobile landing structure, and a location identifier of the potential mobile landing structure. In some embodiments, the location identifier of the potential mobile landing structure is an automatic identification system (AIS) identifier. In some embodiments, the physical location comprises at least one of coordinate location, altitude, bearing, and range. In some embodiments, the object detection module is further configured to identify the detected potential mobile landing structure based on an analysis of at least one of physical location and physical attributes. In some embodiments, the physical attributes comprise at least one of size, shape, and color.

In some embodiments, the mobile landing structure comprises a surface vehicle, a land vehicle, or an air vehicle. In some embodiments, the surface vehicle is a vessel afloat in a body of water. In some embodiments, the surface vehicle is an unmanned surface vehicle. In some embodiments, the communications unit is located on a stationary structure.

In some embodiments, the user interface is configured to display the detected potential mobile landing structures to the user. In some embodiments, the user interface is further configured to receive user input in response to the displayed potential mobile landing structure. In some embodiments, the user input is communicated to the UAV via the communications unit.

In some embodiments, the mobile landing recognition module is further configured to estimate a quiescent period having a start time and an end time based on an analysis of the sensor information, wherein the quiescent period corresponds to the surface of the mobile landing area. In some embodiments, the mobile landing recognition module is further configured to identify a landing initiation time, and the navigation module is further configured to control the lift system at the landing initiation time to bring the UAV into contact with the surface of the mobile landing area during the quiescent period. In some embodiments, the UAV makes contact with the surface of the mobile landing area during the first half of the quiescent period. In some embodiments, the mobile landing recognition module is further configured to identify the mobile landing area by applying a machine learning algorithm to the sensor information. In some embodiments, the machine learning algorithm comprises a visual detection algorithm. In some embodiments, the mobile landing recognition module is further configured to maintain the UAV at a substantially constant position relative to a center of the surface of the mobile landing area.

In some embodiments, the navigation module is further configured to control operation of the lift system to specify an amount of power delivered to each lift mechanism. In some embodiments, the navigation module is configured to control operation of the lift system by decreasing or eliminating an amount of power delivered to the one or more lift mechanisms of the lift system, upon or immediately before bringing the UAV into contact with the surface of the mobile landing area. In some embodiments, the navigation module is configured to control operation of the lift system by specifying an amount of power delivered to the one or more lift mechanisms of the lift system to generate a downward thrust, to maintain contact of the UAV with the surface of the mobile landing area. In some embodiments, the UAV comprises one or more landing feet configured to engage the surface of the mobile landing area on the mobile landing structure.

In some embodiments, the mobile landing area on the mobile landing structure is identified based on a visual identifier on the surface of the mobile landing area, wherein the visual identifier comprises one or more areas of high contrast. In some embodiments, identifying the mobile landing area comprises identifying the visual identifier on the surface of the mobile landing area.

In some embodiments, the system further comprises a wireless guidance mechanism configured to be sensed by the sensor system. In some embodiments, the wireless guidance mechanism comprises a radio frequency identification (RFID) tag, and the sensor system comprises an RFID tag reader. In some embodiments, the sensor system comprises a location sensor, a camera, an inertial sensor, an altitude sensor, a pressure sensor, an audio sensor, a field sensor, or any combination thereof. In some embodiments, the real-time state of the mobile landing area comprises a position, velocity, acceleration, orientation, or any combination thereof. In some embodiments, the processor comprises a low-size, weight, and power (low-SWaP) embedded processor.

In some embodiments, the communications unit is configured to communicate at least one of a position, velocity, acceleration, and orientation of the potential mobile landing structure to the UAV. In some embodiments, the navigation module is further configured to control operation of the lift system to allow the UAV to release a payload onto the mobile landing area. In some embodiments, the navigation module is further configured to control operation of the lift system to move the UAV in a direction substantially vertical to the surface of the mobile landing area within a distance to the mobile landing area.

In another aspect, the present disclosure provides a non-transitory computer-readable medium comprising machine-executable code that, upon execution by one or more computer processors, implements a method for delivering a payload to a mobile landing structure, the method comprising: navigating an unmanned aerial vehicle (UAV) to a vicinity of a mobile landing structure, the UAV having a lift system comprising one or more lift mechanisms configured to propel the UAV; detecting a potential mobile landing structure within the environment of the UAV, based on an analysis of sensor information stored in the non-transitory computer-readable medium by a sensor system of the UAV, the sensor system configured to obtain sensor information related to an environment of the UAV; identifying a mobile landing area on the mobile landing structure based on an analysis of the sensor information; estimating a real-time state of the mobile landing area based on the sensor information, the identification of the mobile landing area, or both; and controlling operation of the lift system to bring the UAV into contact with a surface of the mobile landing area.

In some embodiments, the method further comprises determining a physical location of the potential mobile landing structure based on an analysis of at least one of the sensor information, an estimated coordinate location of the potential mobile landing structure, and a location identifier of the potential mobile landing structure. In some embodiments, the location identifier of the potential mobile landing structure is an automatic identification system (AIS) identifier. In some embodiments, the physical location comprises at least one of coordinate location, altitude, bearing, and range. In some embodiments, the method further comprises identifying the detected potential mobile landing structure based on an analysis of at least one of physical location and physical attributes. In some embodiments, the physical attributes comprise at least one of size, shape, and color.

In some embodiments, the mobile landing structure comprises a surface vehicle, a land vehicle, or an air vehicle. In some embodiments, the surface vehicle is a vessel (e.g., a boat or ship) afloat in a body of water. In some embodiments, the surface vehicle is an unmanned surface vehicle. In some embodiments, the communications unit is located on a stationary structure.

In some embodiments, the method further comprises displaying the detected potential mobile landing structures to the user on a user interface. In some embodiments, the user interface is configured to receive user input in response to the displayed potential mobile landing structure. In some embodiments, the method further comprises communicating the user input to the UAV via a communications unit.

In some embodiments, the method further comprises estimating a quiescent period having a start time and an end time based on an analysis of the sensor information, wherein the quiescent period corresponds to the surface of the mobile landing area. In some embodiments, the method further comprises identifying a landing initiation time, and controlling the lift system at the landing initiation time to bring the UAV into contact with the surface of the mobile landing area during the quiescent period. In some embodiments, the UAV makes contact with the surface of the mobile landing area during the first half of the quiescent period. In some embodiments, identifying the mobile landing area comprises applying a machine learning algorithm to the sensor information. In some embodiments, the machine learning algorithm comprises a visual detection algorithm. In some embodiments, the method further comprises controlling the lift system to maintain the UAV at a substantially constant position relative to a center of the surface of the mobile landing area.

In some embodiments, the method further comprises controlling operation of the lift system to specify an amount of power delivered to each lift mechanism. In some embodiments, the method further comprises controlling operation of the lift system by decreasing or eliminating an amount of power delivered to the one or more lift mechanisms of the lift system, upon or immediately before bringing the UAV into contact with the surface of the mobile landing area. In some embodiments, the method further comprises controlling operation of the lift system by specifying an amount of power delivered to the one or more lift mechanisms of the lift system to generate a downward thrust, to maintain contact of the UAV with the surface of the mobile landing area. In some embodiments, the UAV comprises one or more landing feet configured to engage the surface of the mobile landing area on the mobile landing structure.

In some embodiments, the method further comprises identifying the mobile landing area on the mobile landing structure based on a visual identifier on the surface of the mobile landing area, wherein the visual identifier comprises one or more areas of high contrast. In some embodiments, identifying the mobile landing area comprises identifying the visual identifier on the surface of the mobile landing area.

In some embodiments, the sensor system is configured to sense a wireless guidance mechanism. In some embodiments, the wireless guidance mechanism comprises a radio frequency identification (RFID) tag, and the sensor system comprises an RFID tag reader. In some embodiments, the sensor system comprises a location sensor, a camera, an inertial sensor, an altitude sensor, a pressure sensor, an audio sensor, a field sensor, or any combination thereof. In some embodiments, the real-time state of the mobile landing area comprises a position, velocity, acceleration, orientation, or any combination thereof. In some embodiments, the processor comprises a low-size, weight, and power (low-SWaP) embedded processor.

In some embodiments, the method further comprises receiving at least one of a position, velocity, acceleration, and orientation of the potential mobile landing structure by the UAV via a communications unit. In some embodiments, the method further comprises receiving from the potential mobile landing structure at least one of a position, velocity, acceleration, and orientation of the potential mobile landing structure by the UAV. In some embodiments, the method further comprises controlling operation of the lift system to allow the UAV to release a payload onto the mobile landing area. In some embodiments, the method further comprises controlling operation of the lift system to move the UAV in a direction substantially vertical to the surface of the mobile landing area within a distance to the mobile landing area.

In another aspect, the present disclosure provides a method for delivering a payload to a mobile landing structure, comprising: navigating an unmanned aerial vehicle (UAV) to a vicinity of a mobile landing structure, the UAV having a lift system comprising one or more lift mechanisms configured to propel the UAV; detecting a potential mobile landing structure within the environment of the UAV, based on an analysis of sensor information stored in the non-transitory computer-readable medium by a sensor system of the UAV, the sensor system configured to obtain sensor information related to an environment of the UAV; identifying a mobile landing area on the mobile landing structure based on an analysis of the sensor information; estimating a real-time state of the mobile landing area based on the sensor information, the identification of the mobile landing area, or both; and controlling operation of the lift system to bring the UAV into contact with a surface of the mobile landing area.

In some embodiments, the method further comprises determining a physical location of the potential mobile landing structure based on an analysis of at least one of the sensor information, an estimated coordinate location of the potential mobile landing structure, and a location identifier of the potential mobile landing structure. In some embodiments, the location identifier of the potential mobile landing structure is an automatic identification system (AIS) identifier. In some embodiments, the physical location comprises at least one of coordinate location, altitude, bearing, and range. In some embodiments, the method further comprises identifying the detected potential mobile landing structure based on an analysis of at least one of physical location and physical attributes. In some embodiments, the physical attributes comprise at least one of size, shape, and color.

In some embodiments, the mobile landing structure comprises a surface vehicle, a land vehicle, or an air vehicle. In some embodiments, the surface vehicle is a vessel (e.g., a boat or ship) afloat in a body of water. In some embodiments, the surface vehicle is an unmanned surface vehicle. In some embodiments, the communications unit is located on a stationary structure.

In some embodiments, the method further comprises displaying the detected potential mobile landing structures to the user on a user interface. In some embodiments, the user interface is configured to receive user input in response to the displayed potential mobile landing structure. In some embodiments, the method further comprises communicating the user input to the UAV via a communications unit.

In some embodiments, the method further comprises estimating a quiescent period having a start time and an end time based on an analysis of the sensor information, wherein the quiescent period corresponds to the surface of the mobile landing area. In some embodiments, the method further comprises identifying a landing initiation time, and controlling the lift system at the landing initiation time to bring the UAV into contact with the surface of the mobile landing area during the quiescent period. In some embodiments, the UAV makes contact with the surface of the mobile landing area during the first half of the quiescent period. In some embodiments, identifying the mobile landing area comprises applying a machine learning algorithm to the sensor information. In some embodiments, the machine learning algorithm comprises a visual detection algorithm. In some embodiments, the method further comprises controlling the lift system to maintain the UAV at a substantially constant position relative to a center of the surface of the mobile landing area.

In some embodiments, the method further comprises controlling operation of the lift system to specify an amount of power delivered to each lift mechanism. In some embodiments, the method further comprises controlling operation of the lift system by decreasing or eliminating an amount of power delivered to the one or more lift mechanisms of the lift system, upon or immediately before bringing the UAV into contact with the surface of the mobile landing area. In some embodiments, the method further comprises controlling operation of the lift system by specifying an amount of power delivered to the one or more lift mechanisms of the lift system to generate a downward thrust, to maintain contact of the UAV with the surface of the mobile landing area. In some embodiments, the UAV comprises one or more landing feet configured to engage the surface of the mobile landing area on the mobile landing structure.

In some embodiments, the method further comprises identifying the mobile landing area on the mobile landing structure based on a visual identifier on the surface of the mobile landing area, wherein the visual identifier comprises one or more areas of high contrast. In some embodiments, identifying the mobile landing area comprises identifying the visual identifier on the surface of the mobile landing area.

In some embodiments, the sensor system is configured to sense a wireless guidance mechanism. In some embodiments, the wireless guidance mechanism comprises a radio frequency identification (RFID) tag, and the sensor system comprises an RFID tag reader. In some embodiments, the sensor system comprises a location sensor, a camera, an inertial sensor, an altitude sensor, a pressure sensor, an audio sensor, a field sensor, or any combination thereof. In some embodiments, the real-time state of the mobile landing area comprises a position, velocity, acceleration, orientation, or any combination thereof. In some embodiments, the processor comprises a low-size, weight, and power (low-SWaP) embedded processor.

In some embodiments, the method further comprises receiving at least one of a position, velocity, acceleration, and orientation of the potential mobile landing structure by the UAV via a communications unit. In some embodiments, the method further comprises receiving from the potential mobile landing structure at least one of a position, velocity, acceleration, and orientation of the potential mobile landing structure by the UAV. In some embodiments, the method further comprises controlling operation of the lift system to allow the UAV to release a payload onto the mobile landing area. In some embodiments, the method further comprises controlling operation of the lift system to move the UAV in a direction substantially vertical to the surface of the mobile landing area within a distance to the mobile landing area.

Another aspect of the present disclosure provides a non-transitory computer-readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine-executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
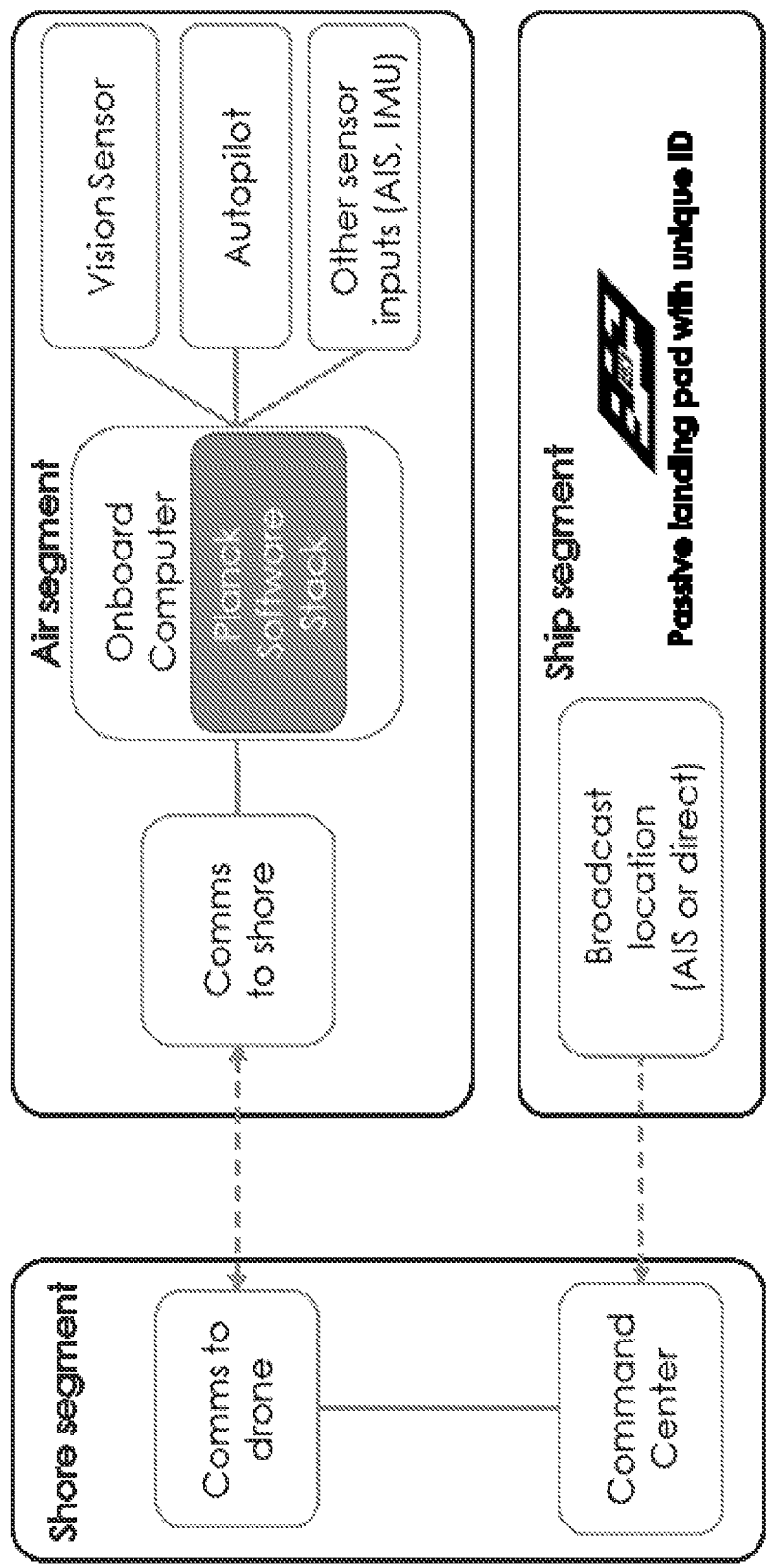
FIG. 1 shows an example of a system architecture of the unmanned aerial system (UAS), in accordance with disclosed embodiments.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The present disclosure provides systems and methods for unmanned aircraft systems (UAS) to perform safe, reliable, and efficient shore-to-ship parcel deliveries. For example, such systems and methods may enable autonomous UAS operation from moving vessels and apply it to the specific needs of applications such as shore-to-shop parcel deliveries. Alternatively, ship-to-ship parcel deliveries can also be performed using systems and methods of the present disclosure, by implementing the shore segment or shore side of the system on a sending ship, which is different from the target ship. Alternatively, shore-to-ship parcel deliveries can also be performed using systems and methods of the present disclosure.

The systems and methods provided herein may include an unmanned aircraft that can operate fully autonomously throughout any one or more (or all) stages of the delivery process, including launch, navigation, landing, and recovery. In some embodiments, the UAV can autonomously take off from shore, transit to a vessel, and precisely land on a small landing area on the vessel. After landing, the parcel may be released or removed. After delivery, the UAV can autonomously take off from the ship, transit back to shore, and land at a predetermined location. The systems and methods provided herein may feature a UAS with autonomous navigation, high-precision shipboard landing, and customized failsafes to ensure reliable operations. Three technologies may work in conjunction to provide such features. First, the UAS can perform search, navigation, and localization of the vessel using GPS coordinates provided by the vessel's wireless guidance system, such as automatic identification system (AIS). Second, the UAS can perform optical detection and geo-location of the target vessel (and other nearby vessels) using machine learning algorithms (e.g., machine vision, image processing, and/or video processing algorithms) to guide the UAS to the target vessel and prepare for landing. Third, the UAS can perform precision landing using a vision-based solution for precision landing on moving platforms. By combining these technologies, systems and methods provided herein can enable UAS to perform safe and reliable parcel deliveries from shore to moored ships.

Systems and methods of the present disclosure can use a concept of operations (CONOP) that has been applied in manned maritime aviation, and can replicate this CONOP in an autonomous unmanned system. In the manned scenario, a pilot can use an RF-based beacon (TACAN, GPS, Direction Finding) to conduct coarse navigation to a ship, followed by a transition to visual cues for final approach and landing. To replicate this task in an autonomous unmanned system, systems and methods provided herein can utilize existing RF beacon systems (e.g., shipboard AIS) as an en-route UAS navigation solution. Once the target vessel is within optical line of sight, an artificial intelligence (AI)-based visual navigation system can be used for final, precision guidance and navigation.

Systems and methods of the present disclosure can be adapted to meet the particular needs of a ship-to-shore use case, such as unmanned parcel delivery. Such systems and methods may comprise a UAS, controlled by an autopilot unit (e.g., Veronte Autopilot or Piccolo Autopilot), capable of autonomously navigating to, visually acquiring, and precisely landing onto a ship, with or without a dedicated flight deck, and with no human pilot intervention. The UAS may comprise software and control systems residing in a secondary computing unit (e.g., comprising an NVIDIA TX2 module) providing inputs to the autopilot based on sensor information (e.g., camera, AIS, and other sensor measurements). The autopilot can be responsible for inner-loop flight controls, and the software can issue outer-loop control commands, similar or equivalent to remote-control (R/C) joystick inputs. The software can receive state information from the autopilot's internal sensors (e.g., GPS, IMU, magnetometer, etc.) and can make inputs to the autopilot based on estimation and control algorithms that reside in the onboard computer. An AIS receiver can provide wireless guidance information to the UAV for initial cueing and to assist with en-route navigation to the destination ship. The UAS can comprise machine learning and autonomous search algorithms to guide the UAV to close proximity of the ship. A vision-based guidance system can be used for terminal navigation, to guide the UAV to a precise landing onto the ship. This vision-based guidance system can be used to guide takeoff from the ship, to ensure obstacle avoidance in the shipboard environment, and to compensate for ship motion during all phases of flight.

In an aspect, the present disclosure provides an unmanned aircraft system (UAS). The UAS can comprise: a communications unit accessible by a user and an unmanned aerial vehicle (UAV). The communications unit can have a user interface, a storage medium, and a communication element. The UAV can comprise a non-transitory computer-readable medium configured to store information and executable programmed modules. Further, the UAV can comprise a lift system comprising one or more lift mechanisms configured to propel the UAV. Further, the UAV can comprise a sensor system configured to obtain sensor information related to an environment of the UAV and at least one of store sensor information in the non-transitory computer-readable medium and transmit sensor information to the communications unit. Further, the UAV can comprise a processor configured to control operation of the lift system and the sensor system. The processor can be communicatively coupled with the non-transitory computer-readable medium and be configured to execute programmed modules stored therein. Further, the UAV can comprise an object detection module stored in the non-transitory computer-readable medium and configured to be executed by the processor. The object detection module can be configured to obtain sensor information stored in the non-transitory computer-readable medium by the sensor system and detect potential mobile landing structures within the environment of the UAV based on an analysis of the sensor information. The object detection module can be further configured to communicate the detected potential mobile landing structures to the communications unit. Further, the UAV can comprise a mobile landing area recognition module stored in the non-transitory computer-readable medium and configured to be executed by the processor. The mobile landing area recognition module can be configured to obtain sensor information stored in the non-transitory computer-readable medium by the sensor system and identify a mobile landing area on a mobile landing structure based on an analysis of the sensor information. Further, the UAV can comprise a navigation module stored in the non-transitory computer-readable medium and configured to be executed by the processor. The navigation module can be configured to estimate a real-time state of the mobile landing area based on an analysis of the sensor information, the identification of the mobile landing area, or both. The navigation module can be further configured to control operation of the lift system to bring the UAV into contact with a surface of the mobile landing area.

FIG. 1 shows an example of a system architecture of the UAS. The UAS can comprise a shore segment, an air segment, and a ship segment. The shore segment can comprise a command center controlling a communications unit. The command center can receive from the ship segment of the UAS a broadcast location of the ship (e.g., directly or through AIS) and/or a visual identifier of a passive landing pad with a unique identifier (ID). The communications unit of the shore segment can be configured to transmit communications between the communications unit of the UAV of the air segment. The air segment of the UAS can comprise an unmanned aerial vehicle (UAV), which includes a communications unit, an onboard computer with a software stack, a vision sensor, an autopilot unit, other sensor inputs (e.g., AIS, IMU). The communications unit of the air segment can be configured to transmit communications between the communications unit of the shore segment. The autopilot unit (e.g., Veronte Autopilot or Piccolo Autopilot) can be integrated using mechanical, electrical, and software interfaces.

To accomplish the autonomous shipboard delivery mission, systems and methods of the present disclosure may be capable of one or more of the following operations. First, the UAS control center can upload a delivery mission to the UAV and initiate the flight. The UAV can take off from a shore location, climb to a safe altitude, and begin transiting toward the predicted ship intercept location. Second, the UAV can enter guidance mode, which provides an intercept to the expected ship location based upon sensor inputs. The ship location information is updated based on automated tracking of ships during this intercept phase, and the aircraft alters course as necessary to make a direct intercept. Third, upon arriving at expected ship location, the UAV can initiate an optimized visual detection algorithm for the landing target. Fourth, once the landing target is detected, the vision-based system can automatically land the UAV onto the ship. Fifth, the package can be delivered, the shipboard users can retrieve the package, and the vision-based system can guide takeoff of the UAV vertically from the ship, ascend the UAV to a safe operational altitude above ship, and return the UAV to shore.

In some embodiments, the UAS can be configured to perform delivery initiation as follows. Once a parcel is loaded onto the UAV, the control center can initiate a delivery mission. Based on the final configuration, the control center can upload either the current ship location (and provide updates as frequently as they are available), the unique AIS identifier of target ship (if the UAS is also equipped with AIS), or both.

Figure 2A:
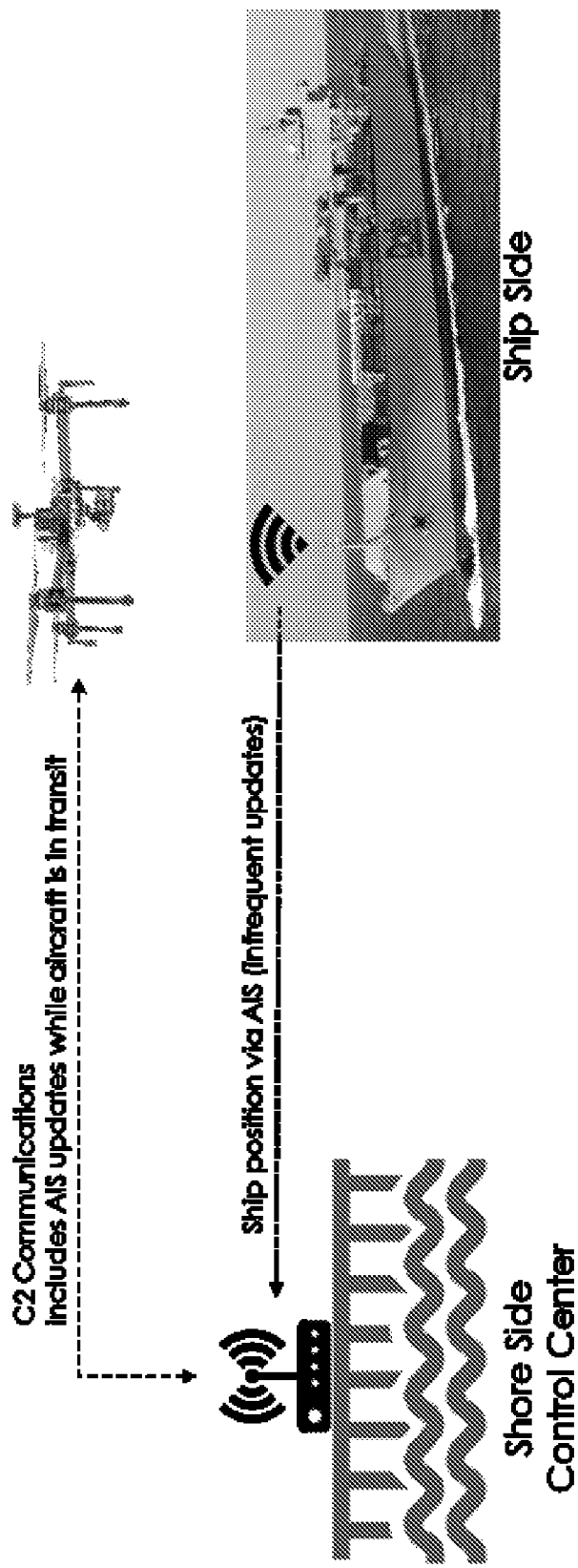
FIG. 2A shows an example of a capability of the UAS, where the control center can send additional ship parameters to the UAV, in accordance with disclosed embodiments.

As shown in FIG. 2A, in some embodiments, the control center can send additional ship parameters to the UAV from a communications unit of the control center to a communications unit of the UAV. These additional ship parameters may include one or more of the following: a unique visual landing target code, a maximum obstacle/superstructure height above the waterline, and/or an approximate horizontal distance between the ship antenna (GPS or AIS) and the landing target location. For example, the ship side can transmit the ship position via AIS (e.g., infrequent updates) to the control center on the shore side. The air side can transmit C2 communications including AIS updates while the UAV is in transit to the control center of the shore side.

The visual landing target code can be pre-determined for each ship. In addition, a ship may have multiple unique codes if there are multiple landing locations available, so that the landing target can be uniquely differentiated from others. These codes can include error detection and correction features. Unique codes can be stored and maintained the control center, which prevents unauthorized users from generating a landing target.

The maximum height can be used to ensure that the UAV maintains flight above all potential obstacles and ensures collision avoidance. Once the UAV detects the landing target, it can stabilize directly above the target (e.g., by maintaining a constant or substantially constant altitude above the target) and descend vertically for landing.

The approximate horizontal distance between the ship antenna and landing target location can provide information to aid in the search process. Since the reported ship location is likely not co-located with the target landing location, some information about the offset can improve the system efficiency, even if that information is only moderately accurate. This horizontal distance can serve to effectively bound the search pattern and can be more relevant to search planning than the vessel length. For example, at a flight altitude of 150 meters, the visual landing approach can have a horizontal field of view of approximately 280 meters, which can make coverage of the potential search area relatively quick, given that long ships can be no more than about 400 meters in length.

In some embodiments, the UAS can be configured to perform transit to the ship as follows. Once the mission is initiated, the UAS can plot an intercept course to the expected ship location. This location may be updated during flight, either from an AIS receiver onboard the UAS, or by occasional updates from the control center. These updates can be treated as a sensor input by the navigation system (e.g., navigation module) of the UAV and help estimate the location of the ship, including drift. These updates can be performed on a frequent or nearly continuous basis (e.g., every few seconds) or on a less frequent basis (e.g., every few minutes). These updates can be useful for performing transit to the ship, even if such updates are provided as infrequently as every few minutes.

In some embodiments, the UAS further comprises a wireless guidance mechanism configured to be sensed by the sensor system. For example, the wireless guidance mechanism can comprise a radio frequency identification (RFID) tag, and the sensor system can comprise an RFID tag reader. The sensor system can comprise a location sensor, a camera, an inertial sensor, an altitude sensor, a pressure sensor, an audio sensor, a field sensor, or any combination thereof.

In some embodiments, the UAV comprises an object detection module configured to obtain sensor information stored or sensed by a sensor system, and to detect potential mobile landing structures within the environment of the UAV based on an analysis of the sensor information. The object detection module can be further configured to communicate the detected potential mobile landing structures to the communications unit of the UAV. The object detection module can be further configured to determine a physical location of the potential mobile landing structure based on an analysis of at least one of the sensor information, an estimated coordinate location of the potential mobile landing structure, and an automatic identification system (AIS) identifier of the potential mobile landing structure. In some embodiments, the physical location comprises at least one of coordinate location and altitude. In some embodiments, the object detection module is further configured to identify the detected potential mobile landing structure based on an analysis of at least one of physical location and physical attributes. In some embodiments, the physical attributes comprise at least one of size, shape, and color.

The UAV can be configured to automatically detect, classify, and geo-locate ships during the transit. This processing can occur in the onboard computer and can refine the estimate of the ship location from previous AIS inputs. The transit to the ship can occur above any known obstacles, including superstructure of other ships, to ensure collision avoidance. The information provided regarding the maximum obstacle/superstructure height above the waterline can be useful toward this obstacle avoidance. The system can use a minimum safe altitude approach for obstacle avoidance in the over-water environment, based on user-selected transit altitudes to and from the destination ship. The system can act as an outer loop control and avoid interfering with any actions of the autopilot unit, by essentially acting as joystick control inputs based upon the sensor environment, such as vessel location and movement. Therefore, if the autopilot unit is certified for airworthiness, the "smart search" capability can be integrated or included without impact to any existing certifications of the system.

The UAS can be configured to perform a search for the landing target (e.g., a mobile landing structure) as follows. Once the UAV reaches the expected ship location based on sensor inputs, it can initiate an automatic search for the target landing location. The details of this search can be updated for efficiency improvements. The search can be a "smart search", in which the ships in an environment of (e.g., the vicinity of) the UAV have been geo-located using a machine learning-based ship detection algorithm of the UAS. The "smart search" can leverage artificial intelligence to enable very efficient geo-location of the ships in the vicinity of the UAV. The search pattern can optimize the likelihood that any individual vessel is the anticipated target in order to minimize the required flight time of the UAV. Once this search pattern and machine learning algorithm have successfully identified the target vessel, the precision landing feature can then guide the UAV to land on the appropriate landing target of the target vessel.

Throughout the search, the UAV can be looking for the target landing location (e.g., a mobile landing structure), which can be marked with a unique identifier (ID). During the search, the target detection can be performed at, for example, 5-10 Hz (Hertz) from a 150-meter altitude, using a fixed downward-facing camera on the aircraft.

In some embodiments, the mobile landing structure comprises a surface vehicle, a land vehicle, or an air vehicle. The surface vehicle can be a vessel (e.g., a boat or ship) afloat in a body of water or an unmanned surface vehicle. In some embodiments, the communications unit is located on a stationary structure. The mobile landing area on the mobile landing structure can be identified based on a visual identifier on the surface of the mobile landing area. For example, the visual identifier can comprise one or more areas of high contrast. Identifying the mobile landing area can comprise identifying the visual identifier on the surface of the mobile landing area (e.g., using vision-based detection algorithms).

In some embodiments, the user interface of the UAS is configured to display the detected potential mobile landing structures to the user (e.g., for visual confirmation). In some embodiments, the user interface is further configured to receive user input in response to the displayed potential mobile landing structure (e.g., to confirm or deny the potential mobile landing structure as the true landing target or mobile landing structure). In some embodiments, the user input is communicated to the UAV via the communications unit.

The UAS can be configured to perform precise landing on the ship, which can be a critical and difficult phase of the mission, as follows. The UAS can be designed specifically for this purpose and enable the UAV to perform autonomous landings in a variety of operational conditions. When the target landing location is automatically detected, the UAS can position the UAV directly overhead of the landing pad and begin to descend the UAV. During this phase, the flight can be in a relative guidance mode between the ship and aircraft, such that velocity and attitude commands are issued to the UAS autopilot to match the vessel motion, as if it were being piloted manually. An estimation algorithm can be running at 400 Hz, onboard the UAS, to track the target landing location throughout the descent. Built-in checks can be performed during the landing operation to ensure that the data is valid, and that the system is performing as expected. If any of these built-in checks do not meet pre-determined specifications, then a fail-safe can be initiated. For example, if the target landing location is covered or obstructed during descent, a detection failsafe can timeout and cause the UAV to immediately stop descending. After an additional timeout, if the landing target is not re-acquired, the UAV can be controlled or directed to ascend back to the initial safe altitude and then either re-attempt the landing or to return to shore, to ensure obstacle avoidance.

If all built-in checks are passed during all phases of the UAV's descent, the UAV can land at the center of the landing target. The final several centimeters of the landing process can occur as a fast descent, at which point the UAV commits to landing. This can designed for safety purposes, and mimics operations of manned helicopters landing on moving vessels. Immediately upon touchdown, the UAS can send a command to the autopilot to turn off the motors, as another safety feature. Many checks can be implemented to ensure that the motors are only turned off upon successful landing. A typical landing accuracy can be about 5 to 10 centimeters (cm), although such landing accuracy can depend partially on the UAV dynamics. In addition, wind tolerance can be taken into account, which can depend largely on the UAV's physical specifications.

The mobile landing recognition module can be further configured to estimate a quiescent period having a start time and an end time based on an analysis of the sensor information. The quiescent period can correspond to the surface of the mobile landing area. The mobile landing recognition module can be further configured to identify a landing initiation time, and the navigation module can be further configured to control the lift system at the landing initiation time to bring the UAV into contact with the surface of the mobile landing area during the quiescent period. For example, the UAV may make contact with the surface of the mobile landing area during the first half of the quiescent period. The mobile landing recognition module can be further configured to identify the mobile landing area by applying a machine learning algorithm to the sensor information. For example, the machine learning algorithm can comprise a visual detection algorithm. The mobile landing recognition module can be further configured to maintain the UAV at a substantially constant position relative to (e.g., "hover" above) a center of the surface of the mobile landing area.

The navigation module can be further configured to control operation of the lift system to specify an amount of power delivered to each lift mechanism. The UAV comprises one or more landing feet configured to engage the surface of the mobile landing area on the mobile landing structure.

The UAS can be configured to perform delivery as follows. Once the UAV has landed, the parcel can be unloaded from the UAV, either manually or automatically. After the parcel is unloaded from the UAV, personnel on the ship can clear the landing area, and the UAV can be ready to return to shore.

In some embodiments, the UAS can be configured to perform takeoff as follows. A command from the control center can initiate the UAV's takeoff, ascent, and transit back to shore. The vision-based navigation system (e.g., navigation module) can also be used for takeoff, guiding the UAV directly up above the landing target. This operation or step can be as critical as the landing phase, because the ship can potentially drift, pitch, or roll during the takeoff ascent. By navigating visually relative to the landing target, the UAV can be ensured to maintain obstacle avoidance until it is above any ship superstructure. Once the UAV is above the maximum obstacle/superstructure height on the ship, it can transition to forward flight for return transit to a fixed shore location.

Figure 2B:
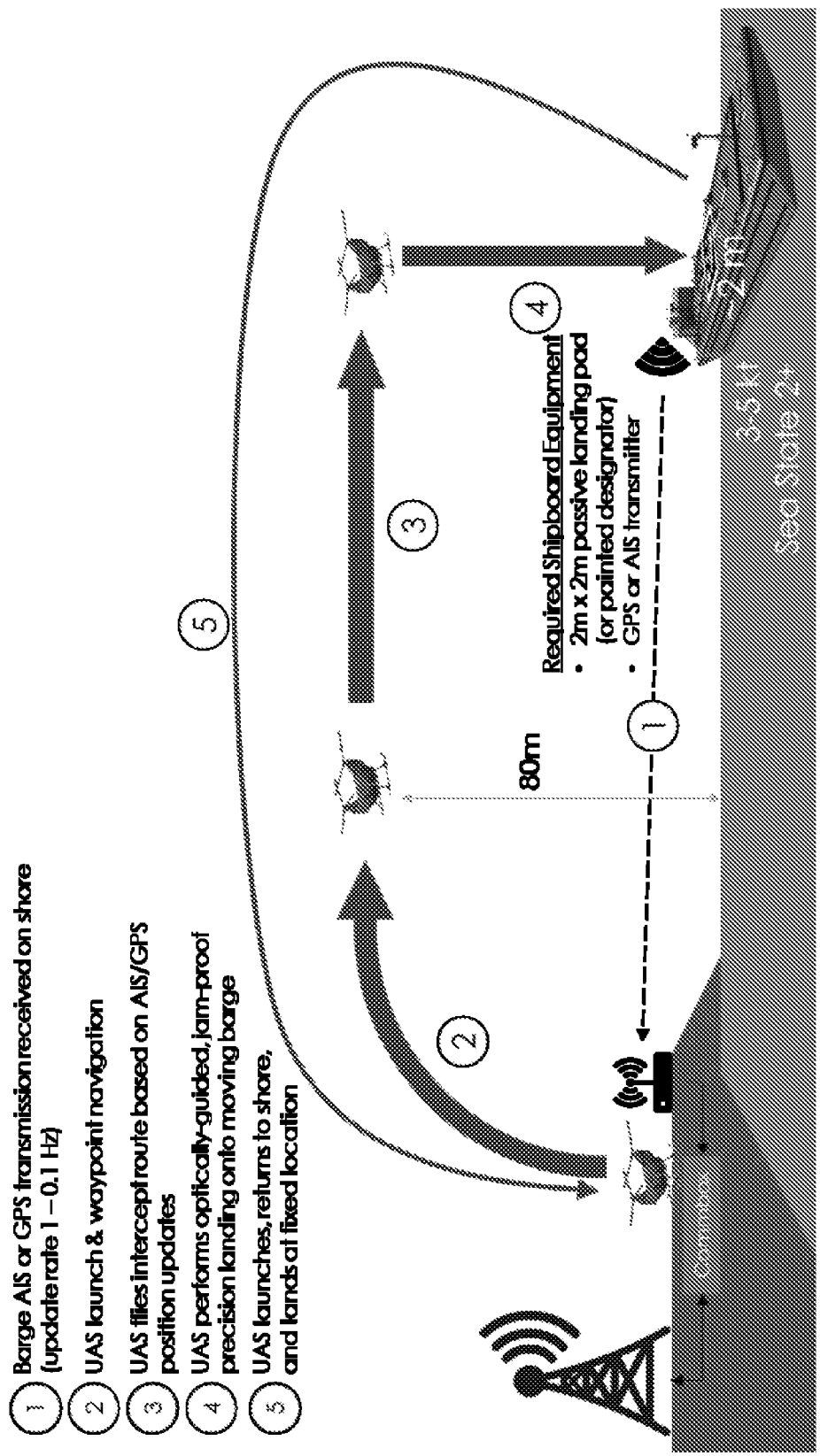
FIG. 2B shows an example of a capability of the UAS, where the UAV can perform delivery to a moving barge (e.g., moving at a speed of about 3-5 kt), in accordance with disclosed embodiments.

FIG. 2B shows an example of a capability of the UAS, where the UAV can perform delivery to a moving barge (e.g., moving at a speed of about 3-5 knots (kt)). First, the barge transmits its physical location by broadcasting an AIS or GPS transmission signal via its AIS or GPS transmitter, which is received on shore (e.g., at an update rate of about 1 to 0.1 Hz). Second, the UAS performs a launch and waypoint navigation toward the physical location of the barge (e.g., at an altitude of about 80 meters (m)). Third, the UAS flies an intercept route based on the AIS/GPS position updates. Fourth, the UAS performs an optically-guided, jam-proof precision landing onto the moving barge, which is equipped with a passive landing pad or painted designator (e.g., a 2-m×2-m passive landing pad). Fifth, after delivering the parcel or payload, the UAS performs another launch, returns to shore, and lands at a fixed location.

Figure 3:
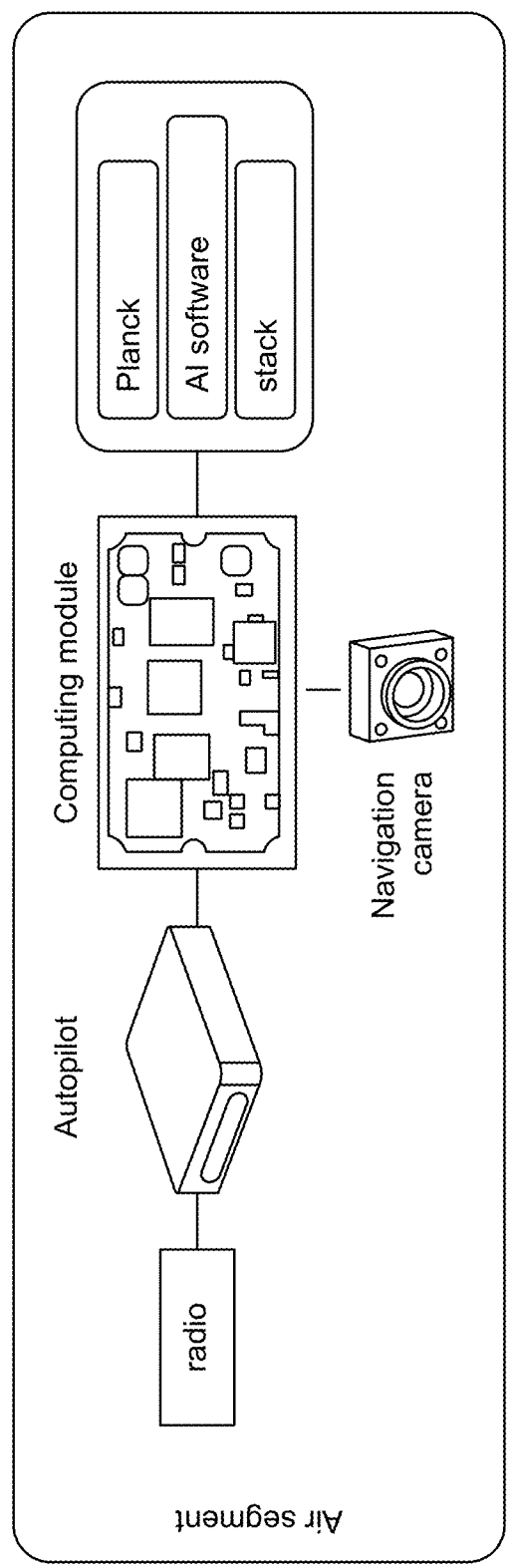
FIG. 3 shows exemplary hardware and software components that are integrated into the UAS, in accordance with disclosed embodiments.

Systems and methods of the present disclosure can comprise hardware and software components that are integrated into the UAS of the air segment, as shown in FIG. 3. The onboard computer of the system can connect to the autopilot unit of the UAS via a serial connection, and can exchange information in the following manner. First, the UAS can issue attitude and velocity commands to the autopilot unit. Second, the UAS can receive aircraft state information from the autopilot unit. Third, the UAS can receive commands from the autopilot unit to engage or disengage the precision navigation mode of the UAV.

The autopilot unit of the UAV can influence a selection of interfaces and any additional sensors that may be required for successful integration with the UAV. In addition, the onboard computer can require a regulated power input from the power system of the UAS, such as at 10-26 volts (V) DC.

Figure 4:
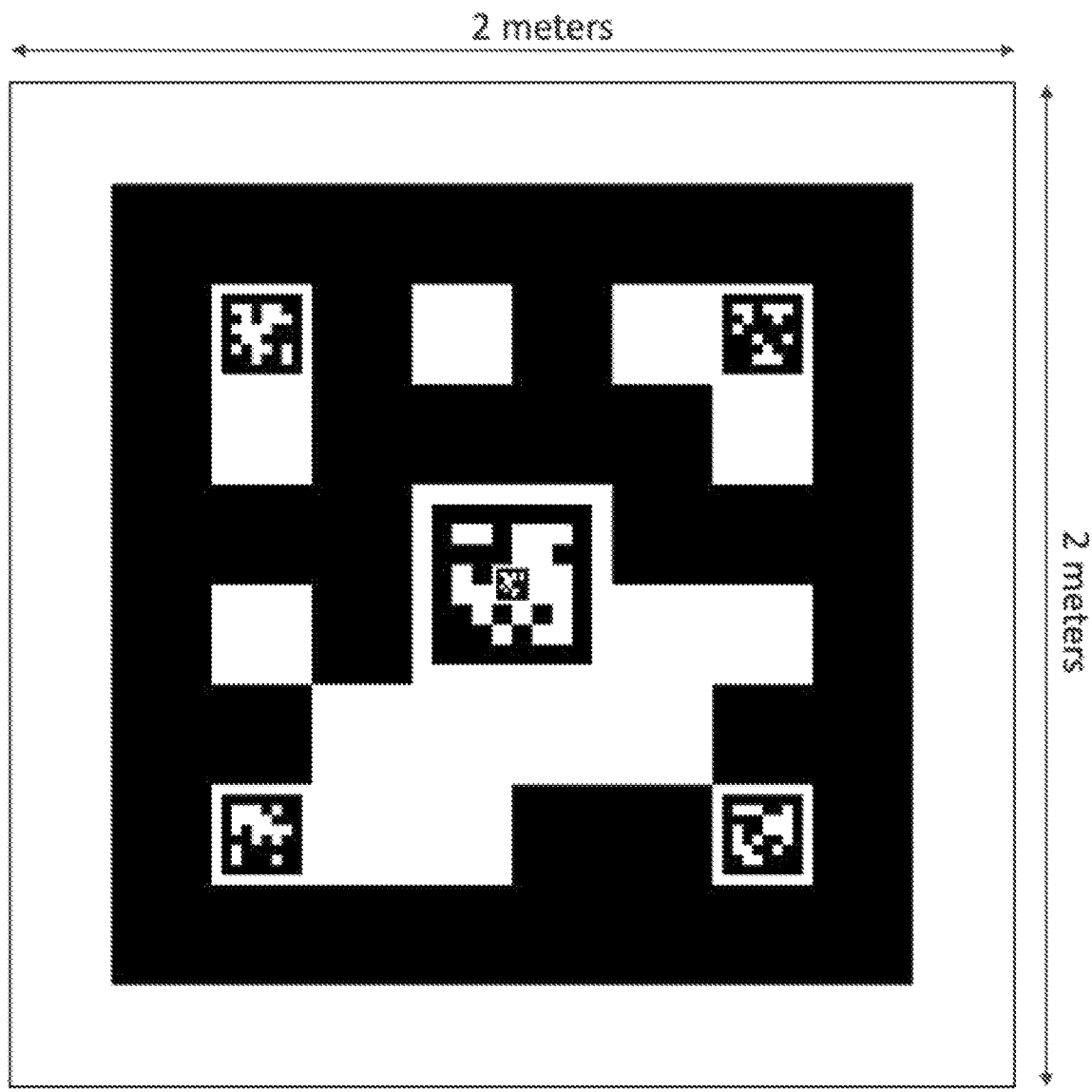
FIG. 4 shows an example of a unique visual identifier at a landing target location, in accordance with disclosed embodiments.

The UAS can also include as another hardware requirement a unique visual identifier at the landing target location. As shown in FIG. 4, the unique visual identifier can be a completely passive component and can be made from a wide range of materials, or even painted directly onto the landing location. For example, the unique visual identifier can comprise a thin piece of aluminum with required markings printed directly onto it. This thin sheet of aluminum can be flexibly folded for storage. Other materials may be suitable as well, such as steel or rubber mat. For an example application, a 2-meter by 2-meter landing target can be made from a material that can be easily disassembled or folded away for stowage. The target pattern can be optically "flat", so as to be robust to glare and lighting variations for accurate detection and identification by the UAV. For night operations of the UAV, the landing target can require illumination, which can be provided by the ship itself.

In some embodiments, the UAS can be configured to perform en-route navigation to the vessel as follows. The UAS can be provided with a location estimate of the ship prior to take-off, from the UAS control center. The ship position estimate may be updated by the UAS control center, while the UAS is in flight, whenever new ship position data becomes available. The aircraft is also optionally outfitted with a low-SWaP AIS receiver that is commercially available. This AIS receiver can act as a sensor input to the UAS system so that the intercept course can be updated whenever new ship position information is available.

While the UAV is en-route to the vessel, the onboard computer of the UAV can fuse the updated ship location via AIS with optical detection and geo-location localization information, as described herein. For example, with the UAV flying at an altitude of 150 meters above the water at 10 meters/second or faster, ships can be visible to the onboard cameras. During this transit, any updated AIS position information can be used to improve the intercept process.

This continuously updated intercept path can be a standard feature of the UAS. The "return to boat" feature can enable the aircraft to plot and update an intercept path to a rapidly moving, dynamically maneuvering small boat. This system can predict future vessel position based on a bounded motion model of both the boat and aircraft, and result in the UAV plotting a "CBDR" (constant bearing, decreasing range) intercept path to the boat at all times during the en-route navigation.

In some embodiments, the UAS can be configured to perform optical detection and geo-location of vessels as follows. The navigation system (e.g., navigation module) can receive a global positioning system (GPS) or global navigation satellite system (GNSS) position of the landing location that is sent directly from the vessel to the UAV, which is updated at a relatively high rate. For example, for a ship parcel delivery system, the GPS or GNSS position of the target ship can be updated via AIS at a much lower rate, and may include a significant amount of latency. Consequently, the actual ship location may differ from the reported GPS or GNSS ship location, for example, by up to 500 meters.

To address this uncertainty in the estimated ship position, the en-route navigation can include an automated process that enables the UAS to search the region of uncertainty of the ship location and optically locate the ship. This approach may be performed without any installed hardware on the ship, other than a passive visual target landing marker to designate the landing location, as described herein.

In some embodiments, a sophisticated en-route navigation solution can use machine learning for optical detection of vessel and a graph-based search algorithm. The UAS can be provided with a location of the ship prior to take-off from the control center, which is updated whenever new information is available. During the UAV's flight out to the estimated ship location, the UAV can use a forward-facing camera and computer vision to automatically detect, track, and geo-locate all ships in the camera field of view. This set of ships can include the target ship. A vision-based ship detector can be implemented using machine learning algorithms. The vision-based ship detector can process a plurality of acquired images using image processing algorithms to automatically detect, classify, track, and geo-locate ships within an image in real-time. In some cases, the images may be generated from or derived from acquired video. During the UAV's transit, the forward-facing camera and vision-based ship detector can geo-locate all ships within a pre-determined distance (e.g., 500 meters) of the expected target location. After the UAV reaches the expected location of the target ship, it can initiate a graph-based search pattern using the locations of all ships within the pre-determined distance (e.g., 500 meters), as logged by the vision-based ship detector during the transit. The graph-based search can be performed using algorithms similar to a traveling salesman problem (an N-P hard problem), for example, and can be optimized for efficiency and accuracy using efficient solvers designed to run quickly on a small number of nodes. This search algorithm can drastically reduce search time by eliminating most of the open-water search, and instead search only a set of ships of interest which include the target ship.

For each ship that is detected, the UAV can be controlled or directed to fly over it. Since the horizontal field of view of the camera can be about 280 meters (with a 200-meter vertical field of view), which is wider than the ships, an additional computer vision algorithm can allow the UAV to fly along the length of the ship, oriented along the centerline, to search for the target landing location. If the ship does not include the correct landing target, the UAV can be controlled or directed to fly directly to the next ship using coordinates generated by the vision-based ship detector.

In some embodiments, the UAS can be configured to perform precision guidance and landing to a delivery point on a ship as follows. The UAS can comprise a vision-aided relative navigation system that uses precise visual observations to accurately estimate the relative state between the aircraft and a landing surface on the boat, and then execute a precision landing. For example, the real-time state (e.g., of the mobile landing area) can comprise a position, velocity, acceleration, orientation, or any combination thereof. These relative state estimates can be used to dynamically position and control the aircraft safely onto the deck. This system can be used to reliably perform autonomous UAS landings, both to moving vessels and moving ground vehicle under a wide range of weather, wind, lighting, visibility, and other environmental conditions.

The precision navigation system can enable fully autonomous operation of the UAV, including push-button precision takeoff and precision landing from confined spaces, moving vehicles, and moving vessels. This system can be designed from the ground up to be aircraft agnostic. The precision navigation system can be a software-based system that can be adapted to many VTOL UAS. The system can use embedded computing power onboard the UAV for all of its functionality, so as to not be reliant on a link, extensive installed hardware, or power on the vessel.

As shown in Table 1, under a variety of examples of conditions, with a multitude of different aircraft and use cases, the system can perform with accuracy of about 5 to 10 centimeters on landing, with vessel motion up to 20 knots and winds up to 24 knots, although the precise speed and wind tolerance can vary depending on the UAV. The precision navigation system can improve the safety, reliability, and efficacy of maritime UAS operations. The software can be integrated into multiple different UAS to enable mobile operations for security and defense applications.

TABLE 1

Precision autonomous landing system performance

| | |
|---|---|
| Accuracy | <10 cm on stationary or moving platforms |
| Vessel speed | 50% of UAV max speed (for autonomous landing) |
| Wind tolerance | 65% max UAV speed (knots of relative wind) |
| Sea state tolerance | 3 (for autonomous landing) |
| Landing descent rate | 0.35-3 m/sec (depending on vessel speed and range) |
| Processor | High performance ARM-based embedded CPU |
| Operating system | Linux |
| Interface | Serial (or customer integration) |
| Software interface protocol | MAVLink (or custom integration) |
| Detection Range (visibility requirement) | 180 meters (with 4K camera) |

The precision navigation system can comprise a single-board embedded processor, running a software stack; a fixed, downward-facing camera; and a visual landing "target". The single-board embedded processor and the fixed, downward-facing camera can be installed into the UAV, and can be very small SWaP-C, commercial-off-the-shelf (COTS) components. A total component weight can be no more than about 500 grams, no more than about 400 grams, no more than about 300 grams, no more than about 200 grams, no more than about 150 grams, no more than about 125 grams, no more than about 100 grams no more than about 90 grams, no more than about 80 grams, no more than about 70 grams, no more than about 60 grams, no more than about 50 grams, no more than about 40 grams, or no more than about 30 grams.

Figure 5:
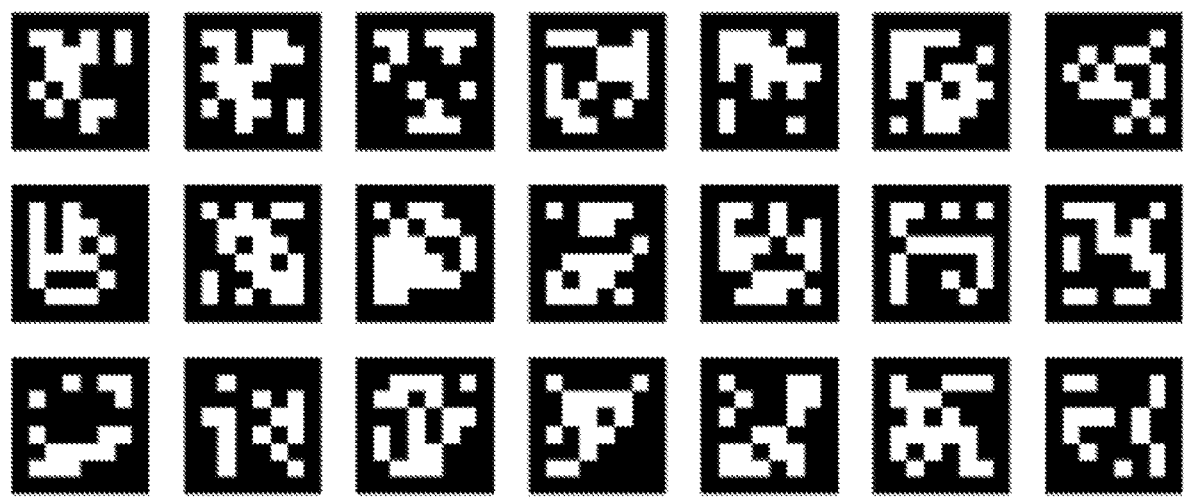
FIG. 5 shows examples of visual targets, which can be similar in form and function to a QR code, in accordance with disclosed embodiments.

The visual target can be installed onboard the ship to enable the UAV to identify a particular landing area. As shown in the examples in FIG. 5, these visual targets can be similar in form and function to a QR code or a two-dimensional bar code (e.g., a matrix bar code). Each target can be encoded with a unique identifier, which the downward camera, through the software, can be capable of decoding, to enable both positive or negative identification of a specific vessel, as well as providing relative positioning and pose information. The target set that the software uses can include thousands of unique target IDs with robust error detection and correction, so that it does not mistake one ID for another. Alternatively or in combination, the visual target can have one or more unique identifiers comprising a registration number, flags, the name of the ship, or a combination thereof.

Operationally, a different target ID can be assigned to every ship, thereby eliminating the possibility that the UAV can visually identify an incorrect ship. Alternatively, ship operators can identify multiple landing areas on a single ship and denote them with different target IDs. For example, a single ship can operate bow, stern, and midship landing areas, each with unique target IDs. As a security feature, the control center can maintain a database of IDs and only issue them to authorized ships. Therefore, the possibility of a parcel being delivered to the incorrect ship can be significantly reduced or eliminated.

The target may provide more information than just a unique ID. The computer vision system can also extract relative pose and range data between the UAV and the landing target at a very high rate, relying exclusively on the computer vision algorithms. The precision landing algorithm can comprise the following operations or steps: detection of the landing target, precise estimation of relative pose and range to landing target, and control inputs to the autopilot unit to execute precision landing on the landing target.

Figure 6:
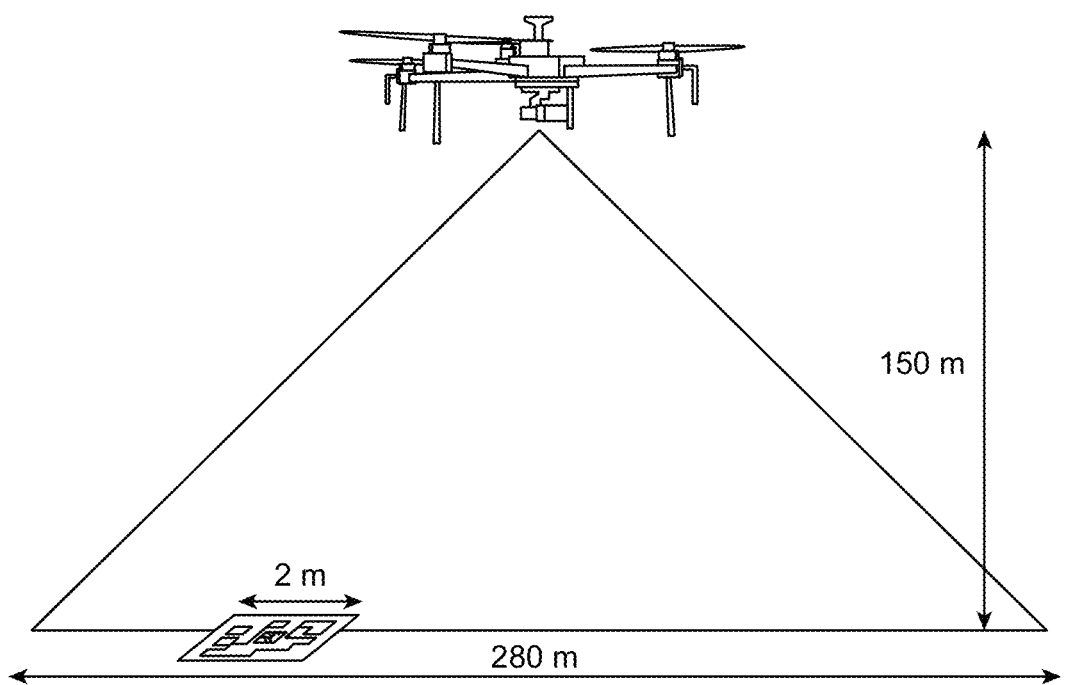
FIG. 6 shows an example of a visual guidance system that can use a small 4K resolution camera, which can detect a 2-meter by 2-meter target from over 150 meters altitude with a lateral offset of ±140 meters, in accordance with disclosed embodiments.

The visual guidance system can be configured to be highly accurate, reliable, and secure. However, it is typically only usable for terminal guidance, due to the fact that visual navigation is effective only when the target is in the field-of-view of the aircraft's downward-facing camera. For example, as shown in FIG. 6, the visual guidance system can use a small 4K resolution camera, which can detect a 2 meter by 2 meter target from over 150 meters altitude with a lateral offset of ±140 meters. Outside of these ranges, an additional sensor input can be required to navigate the UAV to within a visual field-of-view of the target, such as for en-route localization and guidance described herein.

As described in further detail herein, systems and methods of the present disclosure may be configured with some or all of the following features and functionalities necessary to execute autonomous shore-to-ship parcel delivery using UAVs: autonomous, vision-based launch, landing, terminal guidance; landing site intercept calculation (path planning) based on GPS, unique target ID detection and discrimination; navigation (orbit, search) relative to a moving sensor input; user interface to alter obstacle avoidance altitude; user interface to alter target ID parameters; AIS receiver integration onto UAVs; integration of the UAS into third-party aircraft (e.g., consumer quadcopters, VFTOL fixed-wing platforms, single-rotor helicopters, and multi-rotor helicopters); and machine learning for ship detection and "smart" search patterns.

Computer Systems

Figure 7:
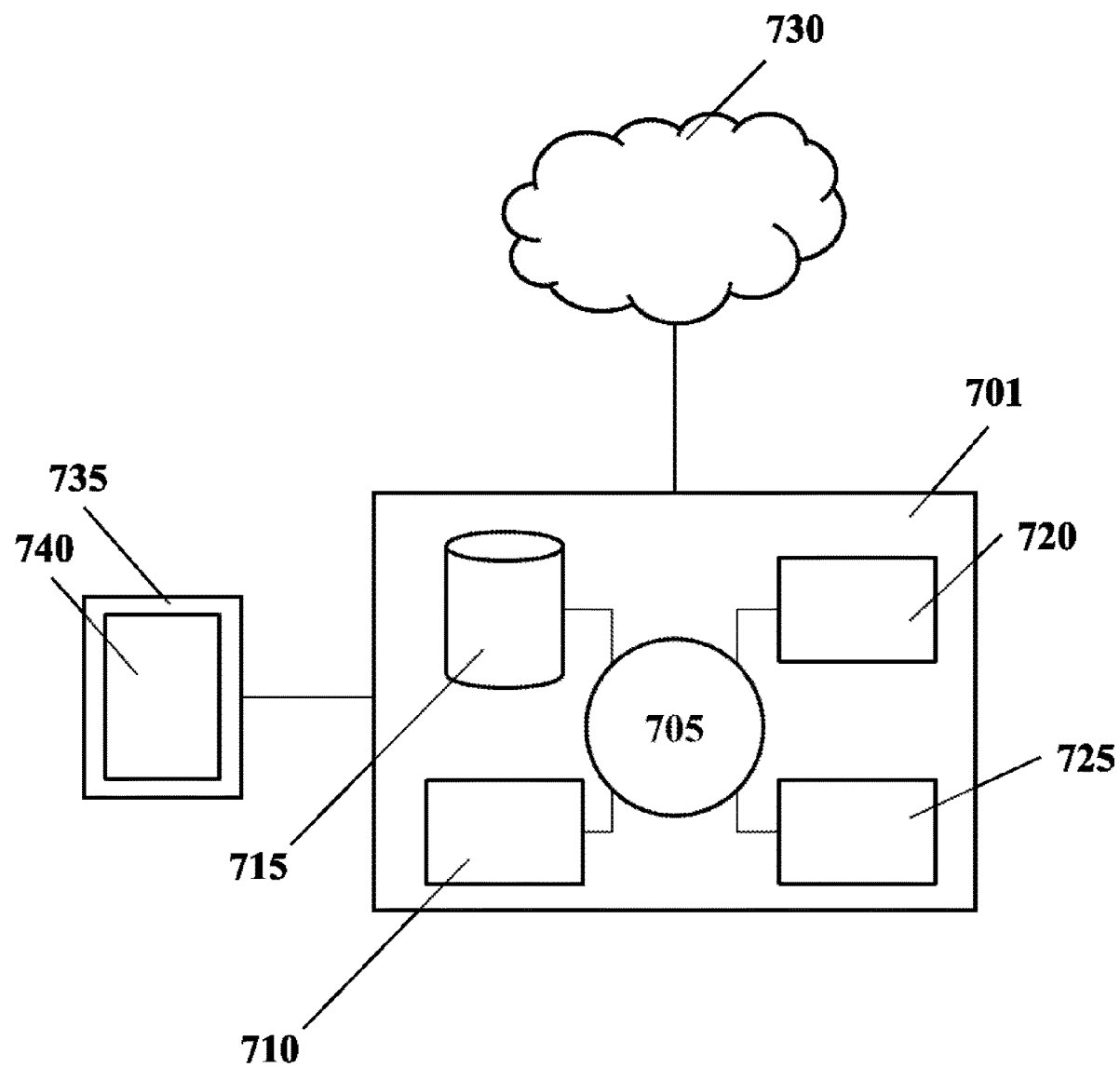
FIG. 7 shows a computer system that is programmed or otherwise configured to implement methods provided herein.

The present disclosure provides computer systems that are programmed to implement methods of the disclosure. FIG. 7 shows a computer system 701 that is programmed or otherwise configured to perform one or more functions or operations for implementing methods and systems disclosed herein. The computer system 701 can regulate various aspects of the portal and/or platform of the present disclosure, such as, for example, (i) navigating a UAV to a vicinity of a mobile landing structure; (ii) detecting a potential mobile landing structure within the environment of the UAV, based on an analysis of sensor information related to an environment of the UAV and obtained by a sensor system; (iii) identifying a mobile landing area on the mobile landing structure based on an analysis of the sensor information; (iv) estimating a real-time state of the mobile landing area based on the sensor information, the identification of the mobile landing area, or both; and (v) controlling operation of a lift system of the UAV to bring the UAV into contact with a surface of the mobile landing area. The computer system 701 can be an electronic device of a user or a computer system that is remotely located with respect to the electronic device. The electronic device can be a mobile electronic device.

The computer system 701 includes a central processing unit (CPU, also "processor" and "computer processor" herein) 705, which can be a single core or multi core processor, or a plurality of processors for parallel processing. The computer system 701 also includes memory or memory location 710 (e.g., random-access memory, read-only memory, flash memory), electronic storage unit 715 (e.g., hard disk), communication interface 720 (e.g., network adapter) for communicating with one or more other systems, and peripheral devices 725, such as cache, other memory, data storage and/or electronic display adapters. The memory 710, storage unit 715, interface 720 and peripheral devices 725 are in communication with the CPU 705 through a communication bus (solid lines), such as a motherboard. The storage unit 715 can be a data storage unit (or data repository) for storing data. The computer system 701 can be operatively coupled to a computer network ("network") 730 with the aid of the communication interface 720. The network 730 can be the Internet, an internet and/or extranet, or an intranet and/or extranet that is in communication with the Internet.

The network 730 in some cases is a telecommunication and/or data network. The network 730 can include one or more computer servers, which can enable distributed computing, such as cloud computing. For example, one or more computer servers may enable cloud computing over the network 730 ("the cloud") to perform various aspects of analysis, calculation, and generation of the present disclosure, such as, for example, (i) navigating a UAV to a vicinity of a mobile landing structure; (ii) detecting a potential mobile landing structure within the environment of the UAV, based on an analysis of sensor information related to an environment of the UAV and obtained by a sensor system; (iii) identifying a mobile landing area on the mobile landing structure based on an analysis of the sensor information; (iv) estimating a real-time state of the mobile landing area based on the sensor information, the identification of the mobile landing area, or both; and (v) controlling operation of a lift system of the UAV to bring the UAV into contact with a surface of the mobile landing area. Such cloud computing may be provided by cloud computing platforms such as, for example, Amazon Web Services (AWS), Microsoft Azure, Google Cloud Platform, and IBM cloud. The network 730, in some cases with the aid of the computer system 701, can implement a peer-to-peer network, which may enable devices coupled to the computer system 701 to behave as a client or a server.

The CPU 705 can execute a sequence of machine-readable instructions, which can be embodied in a program or software. The instructions may be stored in a memory location, such as the memory 710. The instructions can be directed to the CPU 705, which can subsequently program or otherwise configure the CPU 705 to implement methods of the present disclosure. Examples of operations performed by the CPU 705 can include fetch, decode, execute, and writeback.

The CPU 705 can be part of a circuit, such as an integrated circuit. One or more other components of the system 701 can be included in the circuit. In some cases, the circuit is an application specific integrated circuit (ASIC). The storage unit 715 can store files, such as drivers, libraries and saved programs. The storage unit 715 can store user data, e.g., user preferences and user programs. The computer system 701 in some cases can include one or more additional data storage units that are external to the computer system 701, such as located on a remote server that is in communication with the computer system 701 through an intranet or the Internet.

The computer system 701 can communicate with one or more remote computer systems through the network 730. For instance, the computer system 701 can communicate with a remote computer system of a user (e.g., a mobile device of the user). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 701 via the network 730.

Methods provided herein can be implemented by way of machine (e.g., computer processor) executable code stored on an electronic storage location of the computer system 701, such as, for example, on the memory 710 or electronic storage unit 715. The machine-executable or machine-readable code can be provided in the form of software. During use, the code can be executed by the processor 705. In some cases, the code can be retrieved from the storage unit 715 and stored on the memory 710 for ready access by the processor 705. In some situations, the electronic storage unit 715 can be precluded, and machine-executable instructions are stored on memory 710.

The code can be pre-compiled and configured for use with a machine having a processor adapted to execute the code or can be compiled during runtime. The code can be supplied in a programming language that can be selected to enable the code to execute in a pre-compiled or as-compiled fashion.

Aspects of the systems and methods provided herein, such as the computer system 701, can be embodied in programming. Various aspects of the technology may be thought of as "products" or "articles of manufacture" typically in the form of machine (or processor) executable code and/or associated data that is carried on or embodied in a type of machine-readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine-readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer-readable media may be involved in carrying one or more sequences of one or more instructions to a processor for execution.

The computer system 701 can include or be in communication with an electronic display 735 that comprises a user interface (UI) 740 for providing, for example, user management and input regarding UAV operations such as selecting or verifying detected potential mobile landing structures. Examples of UIs include, without limitation, a graphical user interface (GUI) and web-based user interface.

Methods and systems of the present disclosure can be implemented by way of one or more algorithms. An algorithm can be implemented by way of software upon execution by the central processing unit 705. The algorithm can, for example, (i) navigate a UAV to a vicinity of a mobile landing structure; (ii) detect a potential mobile landing structure within the environment of the UAV, based on an analysis of sensor information related to an environment of the UAV and obtained by a sensor system; (iii) identify a mobile landing area on the mobile landing structure based on an analysis of the sensor information; (iv) estimate a real-time state of the mobile landing area based on the sensor information, the identification of the mobile landing area, or both; and (v) control operation of a lift system of the UAV to bring the UAV into contact with a surface of the mobile landing area.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. An unmanned aircraft system, comprising:
   a communications unit accessible by a user, the communications unit having a user interface, a storage medium, and a communication element; and
   an unmanned aerial vehicle (UAV) comprising:
      a non-transitory computer-readable medium configured to store information and executable programmed modules;
      a lift system comprising one or more lift mechanisms configured to propel the UAV;
      a sensor system configured to obtain sensor information related to an environment of the UAV and at least one of store sensor information in the non-transitory computer-readable medium and transmit sensor information to the communications unit;
      a processor configured to control operation of the lift system and the sensor system, the processor communicatively coupled with the non-transitory computer-readable medium and configured to execute programmed modules stored therein;
      an object detection module stored in the non-transitory computer-readable medium and configured to be executed by the processor, the object detection module configured to obtain sensor information stored in the non-transitory computer-readable medium by the sensor system and detect potential mobile landing structures within the environment of the UAV based on an analysis of the sensor information, wherein each of the potential mobile landing structures is capable of accommodating the UAV;
      a mobile landing area recognition module stored in the non-transitory computer-readable medium and configured to be executed by the processor, the mobile landing area recognition module configured to obtain sensor information stored in the non-transitory computer-readable medium by the sensor system and identify a mobile landing area on a target mobile landing structure of the potential mobile landing structures based on an analysis of the sensor information obtained from a signal transmitted via a transmitter of the target mobile landing structure and an analysis of an input of a visual identifier located on the mobile landing area; and a navigation module stored in the non-transitory computer-readable medium and configured to be executed by the processor, the navigation module configured to estimate a real-time state, including a location, of the mobile landing area based on an analysis of the sensor information, the identification of the mobile landing area, or both, the navigation module further configured to navigate the UAV to the mobile landing area based on a location of the target mobile landing structure obtained via the transmitter and a horizontal distance between a location of the transmitter and the estimated real-time state of the mobile landing area, and control operation of the lift system to bring the UAV into contact with a surface of the mobile landing area, wherein the navigation module is configured to refine the estimated real-time state from a previous input of the visual identifier, wherein the navigation module is further configured to control operation of the lift system to allow the UAV to release a payload onto the mobile landing area, wherein the real-time state of the mobile landing area comprises at least one of: a position, a velocity, an acceleration, and an orientation, wherein when the target mobile landing structure is automatically detected, the UAV is positioned directly overhead of a landing pad with the visual identifier and begins to descend the UAV in a relative guidance mode between the target mobile landing structure and the UAV, such that velocity and attitude commands are issued to the navigation module based on the real-time state of the mobile landing area to match the motion of the target mobile landing structure to track the target mobile landing structure throughout the descent, and wherein the user interface is configured to display the detected potential mobile landing structures to the user for visual confirmation, and wherein the user interface is configured to receive a user input in response to the displayed potential mobile landing structure.

2. The system of claim 1, wherein the object detection module is further configured to determine a physical location of the potential mobile landing structure based on an analysis of at least one of the sensor information, an estimated coordinate location of the potential mobile landing structure, and a location identifier of the potential mobile landing structure.

3. The system of claim 2, wherein the location identifier of the potential mobile landing structure is an automatic identification system (AIS) identifier.

4. The system of claim 1, wherein the object detection module is further configured to identify the detected potential mobile landing structure based on an analysis of at least one of physical location and physical attributes.

5. The system of claim 4, wherein the physical attributes comprise at least one of size, shape, and color.

6. The system of claim 1, wherein the user interface is configured to display the detected potential mobile landing structures to the user.

7. The system of claim 6, wherein the user interface is further configured to receive user input in response to the displayed potential mobile landing structure.

8. The system of claim 7, wherein the user input is communicated to the UAV via the communications unit.

9. The system of claim 1, wherein the mobile landing recognition module is further configured to estimate a quiescent period having a start time and an end time based on an analysis of the sensor information, wherein the quiescent period corresponds to the surface of the mobile landing area.

10. The system of claim 9, wherein the mobile landing recognition module is further configured to identify a landing initiation time, and wherein the navigation module is further configured to control the lift system at the landing initiation time to bring the UAV into contact with the surface of the mobile landing area during the quiescent period.

11. The system of claim 10, wherein the UAV makes contact with the surface of the mobile landing area during the first half of the quiescent period.

12. The system of claim 1, wherein the mobile landing recognition module is further configured to identify the mobile landing area by applying a machine learning algorithm to the sensor information.

13. The system of claim 12, wherein the machine learning algorithm comprises a visual detection algorithm.

14. The system of claim 1, wherein the mobile landing recognition module is further configured to maintain the UAV at a substantially constant position relative to a center of the surface of the mobile landing area.

15. The system of claim 1, wherein the navigation module is configured to control operation of the lift system by decreasing or eliminating an amount of power delivered to the one or more lift mechanisms of the lift system, upon or immediately before bringing the UAV into contact with the surface of the mobile landing area.

16. The system of claim 1, wherein the navigation module is configured to control operation of the lift system by specifying an amount of power delivered to the one or more lift mechanisms of the lift system to generate a downward thrust, to maintain contact of the UAV with the surface of the mobile landing area.

17. The system of claim 1, wherein the mobile landing area on the mobile landing structure is identified based on a visual identifier on the surface of the mobile landing area, wherein the visual identifier comprises one or more areas of high contrast.

18. The system of claim 17, wherein identifying the mobile landing area comprises identifying the visual identifier on the surface of the mobile landing area.

19. The system of claim 1, further comprising a wireless guidance mechanism configured to be sensed by the sensor system.

20. The system of claim 1, wherein the navigation module is further configured to control operation of the lift system to move the UAV in a direction substantially vertical to the surface of the mobile landing area within a distance to the mobile landing area.

* * * * *